United States Patent

[11] 3,601,070

[72] Inventor John Lambiris
 New York, N.Y.
[21] Appl. No. 852,351
[22] Filed Aug. 22, 1969
[45] Patented Aug. 24, 1971
[73] Assignees Richard George Reimus
 Warren, Pa.;
 Struthers Scientific and International Corporation
[32] Priority Aug. 27, 1968
[33] Great Britain
[31] 40870/68

[54] TOTAL INCINERATION PROCESS
 6 Claims, 1 Drawing Fig.
[52] U.S. Cl. ................................................ 110/10
[51] Int. Cl. ................................................ F23g 5/02
[50] Field of Search ............................. 110/7, 8, 10

[56] References Cited
UNITED STATES PATENTS
| | | | |
|---|---|---|---|
| 2,213,668 | 9/1940 | Dundas et al. | 110/15 |
| 3,319,586 | 5/1967 | Albertson et al. | 110/8 |
| 3,472,186 | 10/1969 | Osterman | 110/15 X |

*Primary Examiner*—Kenneth W. Sprague
*Attorney*—William A. Drucker

ABSTRACT: Waste water is cycled through a wet scrubber and a fluid bed incinerator fed by a first combustion chamber so that the waste water is concentrated in the wet scrubber as it removes solid particles from gases introduced from the fluid bed incinerator, the fluid bed incinerator removing inorganic solids at relatively low temperatures, gaseous effluent from the wet scrubber and hot gases from a second combustion chamber passing to a second firing chamber to oxidize organic matter entrained in the gaseous effluent at a higher temperature, the gaseous effluent passing through a steam boiler for heat recovery.

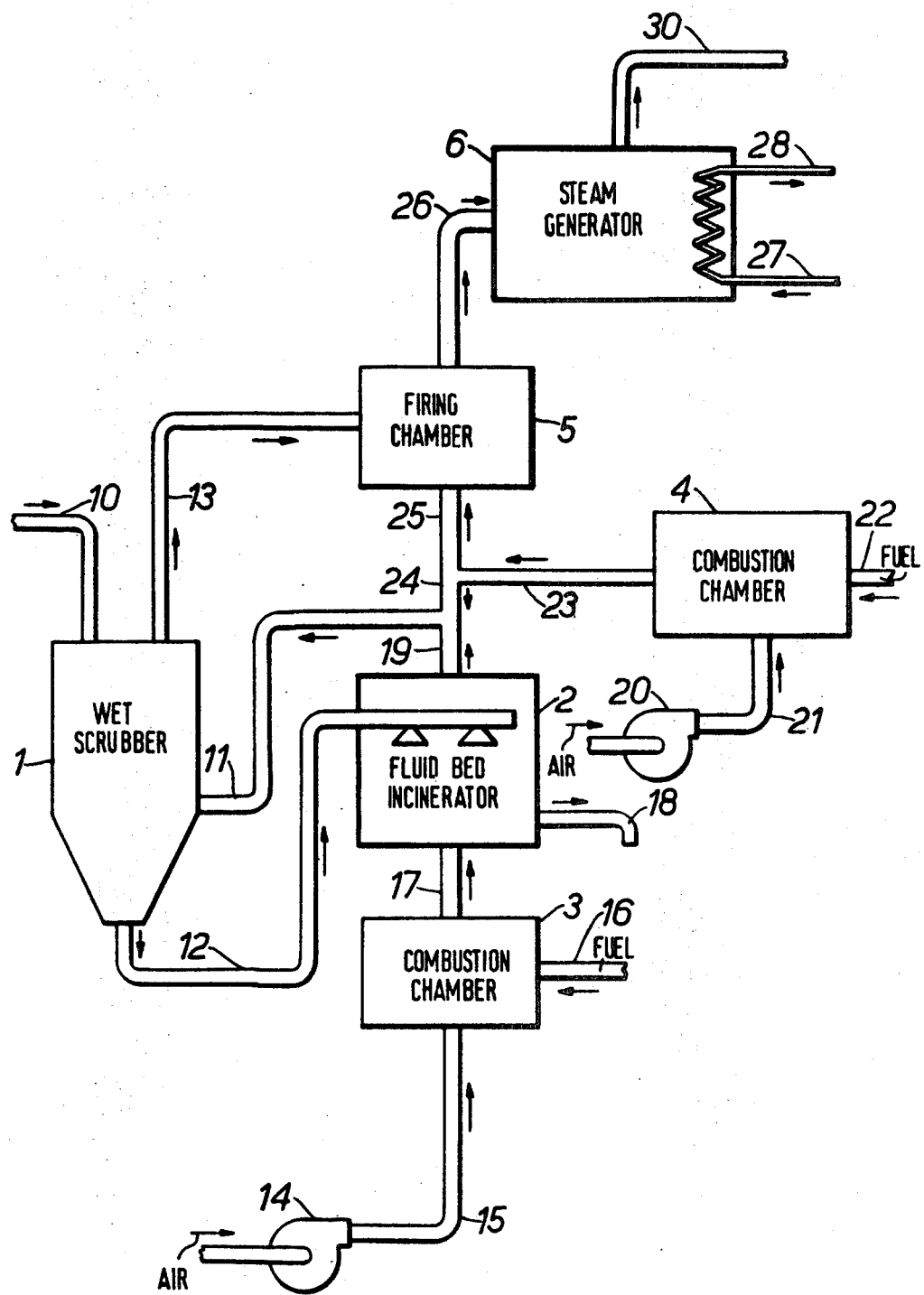

TOTAL INCINERATION PROCESS

BACKGROUND OF THE INVENTION

There is a great need to economically treat and clean up dilute waste water containing combinations of toxic organic and inorganic substances. Such toxic organic compounds could be herbicides, insecticides, etc. In solution with inorganics such as NaCL, $Na_2SO_4$, NaOh, etc. This invention provides an economical process for the treatment of such waste water.

SUMMARY OF THE INVENTION

A fluid bed incinerator is fed by hot gases from a first combustion chamber in which fuel is burned in an oxygen rich atmosphere and it is fed by concentrated waste water from a wet scrubber, the wet scrubber receiving waste water to scrub the hot gases from the fluid bed incinerator to remove solid particles therefrom while the hot gases concentrate the waste water for feeding to the fluid bed incinerator, the gaseous effluent from the wet scrubber and hot gases from a secondary combustion chamber being mixed at a higher temperature in a secondary firing chamber to oxidize and thermally destroy organic compounds therein, the gaseous effluent from the secondary firing chamber passing through a steam generator for heat recovery therefrom.

This invention uses a wet scrubber which is one of the most effective pieces of apparatus for the removal of fine particles from a gas. This allows the gaseous effluent to be ultimately used in a stream generator because, without the removal of the fine particles, precipitates would form on the heat transfer surfaces of the steam generator. In addition, the wet scrubber evaporates a large portion of the waste water by direct contact heat exchange without the use of a costly multieffect evaporation system.

The two stage incineration system of this invention allows the fluid bed to operate at a lower temperature at which organic salts do not fuse to render the fluid bed inoperable. The system then allows the subsequent higher temperature destruction of toxic organic compounds and the recovery of heat in a steam generator.

BRIEF DESCRIPTION OF THE DRAWING

The FIGURE of the Drawing is a schematic diagram showing the apparatus of this invention and the flow therethrough.

DESCRIPTION OF THE PREFERRED EMBODIMENT

As shown in the Drawing, pipe 10 feeds dilute waste water containing toxic organic compounds and inorganics to a wet scrubber 1 which may be of the tray or the cyclonic type. A counterflow of hot gases enters the wet scrubber through pipe 11. The dilute waste water is vaporized and concentrated by the hot gases so that concentrated waste water flows from wet scrubber 1 through line 12. Effluent gases leave wet scrubber 1 through line 13. These effluent gases are water saturated, and, for example, at a temperature of 170° F.

The wet scrubber 1 serves two main purposes. First, it concentrates the waste water by direct contact heat exchange which obviates the need for costly multieffect heat exchange equipment with heat exchange surfaces which would have scaling problems. Thus the wet scrubber eliminates scaling problems at this stage of the process. Second, it removes all solid particles from the effluent gases leaving the wet scrubber through pipe 13. This eliminates scaling problems at a later stage of the process as will be explained.

Line 12 leads from the wet scrubber 1 to the fluid bed incinerator 2 to spray the concentrated waster water into it. Blower 14 introduces excess air through pipe 15 into first combustion chamber 3 to burn any suitable fuel introduced through line 16. The resulting hot gases flow from combustion chamber 3 through line 17 into the fluid bed incinerator to vaporize remaining water and form a fluidized bed of solid particles or granules made from the inorganic solids in the concentrated water water. These solids in the fluidized bed are maintained at a temperature below their fusion pint but high enough to drive out any organic compounds. An example of such a temperature would be between 1,000° and 1,300° F. Thus, the sprayed concentrated waste from pipe 12 splashes in droplet form on the fluidized bed to contact the hot gases from pipe 17 which sustain the bed. The water is evaporated and organic compounds are driven into the gaseous phase by evaporation, sublimation, thermal degradation, and oxidation. The inorganic solids are continually discharged from the incinerator as a dry granular product through pipe 18. The rate of removal of these granular salts is equal to the rate of solids deposition from the incinerated waste solution. The solid particles from pipe 18 may be cooled to atmospheric conditions with an air cooler or the like and they are then ready for final disposal or use.

The gaseous effluent from incinerator 2 passes through pipe 19 to pipe 11 to pass through the wet scrubber 1 as described. Blower 20 introduces an excess of air through pipe 21 into the second combustion chamber 4 where fuel introduced through pipe 22 is burned. Combusted gases from chamber 4 pass through line 23. Some of these combusted gases pass through pipe 25 to enter the secondary firing chamber 5 to mix with the effluent gases from pipe 13. At an elevated temperature of from 1,600° to 2,000° F. In chamber 5, organic compounds in the effluent gases are completely oxidized and converted to $CO_2$, $SO_2$, etc. Many fuels are suitable to be combusted with excess air in chamber 4 to provide the high heat required in the secondary firing chamber 5.

The superheated water vapor and gaseous products from chamber 5 pass through line 26 to a heat recovery boiler 6 for steam generation. Condensate enters line 27 to pass through steam generator 6 and leave as steam through line 28. The quality of the generated steam is equivalent to a temperature of 700° F, and a pressure of 400 p.s.i.g. If desired, the exhaust gases from steam generator 6 passing out through pipe 30 may be scrubbed with a dilute solution of sodium carbonate if there are air pollutants present such as HCL, HF, $P_2O_5$, $SO_2$, etc. in the exhaust gases. Any solids (inorganic salts) that might form in such a scrubber may be recycled into the system to be mixed with waste water in pipe 10 and removed by the fluid bed incinerator 2.

The use of the wet scrubber 1 between incinerator stages removes fine particles from the fluid bed incinerator effluent gases to allow the operation of the steam generator 6. If fine solids did reach the steam generator 6, they would precipitate on its heat transfer areas to foul it and reduce its capacity and require its more frequent shutdown and cleaning.

Not only does the wet scrubber 1 concentrate the waste water flowing from pipe 10, but by so doing it reduces the heat duty of the fluid bed incinerator 2 to cut its size and cost.

The two-stage incineration technique applied in this system makes it unique and independent of the nature of the organic compounds present in the waste water. It is well known from the literature that certain toxic organic compounds require a temperature of 1,600° to 2,000° F. for their complete thermal or oxidative destruction. In a one-stage incineration step an operating temperature of 1,600° to 2,000° F. would render the fluid bed incinerator inoperable because the fluid bed particles, made up of inorganic salts like NaCl, NaO, $Na_2SO_4$, etc. would fuse together and their fluidization would be impossible because the fusion temperature of a mixture of inorganic salts is in the vicinity of 1,200° to 1,300° F. With the two-stage incineration of this process, this operational difficulty is bypassed. The operating temperature in the first-stage incinerator is maintained below the fusion point but it is sufficiently high to drive out all the organics in the gas phase. Subsequently, all the organics are completely destroyed in the second-stage incinerator at an elevated temperature of 1,600° to 2,000° F.

In this process, a heat recovery unit 6 is incorporated to generate steam and salvage a good portion of the fuel cost, making the waste treatment more economical.

It should be noted that, in some applications, the combustion chambers 3 and 4 could be combined with or closely associated with the fluid bed incinerator 2 and the secondary firing chamber 5.

What I claimed is:

1. Waste water treatment apparatus comprising, in combination, a wet scrubber, a fluid bed incinerator, means conducting hot gases from said fluid bed incinerator to said scrubber and means conducting water to said scrubber, said wet scrubber concentrating waste water and removing solid particles from the hot gases leaving the fluid bed incinerator, means conducting concentrated waste water from said wet scrubber to said fluid bed incinerator to vaporize water and gasify organics therein to form a fluidized bed of inorganics, said fluid bed incinerator discharging granules of inorganics from a fluidized bed, a high temperature secondary firing chamber, means conducting effluent gases from said wet scrubber to said secondary firing chamber to oxidize organics therein, and a steam generator including means conducting effluent gases from said secondary firing chamber to said generator, said steam generator recovering waste heat from said effluent gases.

2. The combination according to claim 1 wherein the temperature in said fluid bed incinerator is under 1,300° F. and the temperature in said secondary firing chamber is over 1,600° F.

3. The process of treating a dilute waste water solution containing organic and inorganic pollutants comprising the steps of:

a. passing the dilute waste water to a wet scrubber;

b. passing effluent gases from a fluid bed incinerator into the wet scrubber counter current to the dilute waste water to have solids removed from the effluent gases while the gases evaporate water by direct contact heat exchange to concentrate the waste solution;

c. passing the concentrated waste solution to the fluid bed incinerator to be fluidized as a bed therein by combusted gases which evaporate water from the concentrated wastes and render inorganics gaseous to provide the effluent gases passed to the wet scrubber in step (b);

d. removing inorganic material from the fluidized bed of the fluid bed incinerator;

e. passing effluent gases from the wet scrubber to a second higher temperature firing chamber to be mixed with the combusted gases to oxidize and break down the organics; and f. passing effluent gases from the second firing chamber through a steam generator to recover heat therefrom.

4. The process according to claim 3 wherein in step (c) combusted gases are provided by a first combustion chamber and wherein in step (e) the combusted gases are provided in a second higher temperature combustion chamber.

5. The process according to claim 4 wherein some of the combusted gases from the second higher temperature combustion chamber are passed into said wet scrubber.

6. The process according to claim 3 wherein the temperature in the fluid bed incinerator is under 1,300° F. and the temperature in said second firing chamber is over 1,600° F.

UNITED STATES PATENT OFFICE
CERTIFICATE OF CORRECTION

Patent No. 3,601,070         Dated August 24, 1971

Inventor(s) John Lambiris et al.

It is certified that error appears in the above-identified patent and that said Letters Patent are hereby corrected as shown below:

On the cover sheet "[72]" insert -- Richard George Reimus, Warren, Pa. --; "[73]" cancel "Richard George Reimus, Warren, Pa.;".

Signed and sealed this 25th day of July 1972.

(SEAL)
Attest:

EDWARD M. FLETCHER, JR.                    ROBERT GOTTSCHALK
Attesting Officer                          Commissioner of Patents